J. H. BURKHOLDER.

RATCHET DEVICE FOR LIFTING JACKS.

APPLICATION FILED MAR. 24, 1911.

Reissued Sept. 5, 1911.

13,290.

ATTEST

E. M. Fisher

F. C. Mussun.

INVENTOR

JOHN H. BURKHOLDER

BY Fisher & Moser ATTYS.

COLUMBIA PLANOGRAPH CO., WASHINGTON, D. C.

UNITED STATES PATENT OFFICE.

JOHN H. BURKHOLDER, OF ASHLAND, OHIO, ASSIGNOR TO THE ELITE MANUFACTURING COMPANY, OF ASHLAND, OHIO, A CORPORATION.

RATCHET DEVICE FOR LIFTING-JACKS.

13,290. Specification of Reissued Letters Patent. Reissued Sept. 5, 1911.

Original No. 963,206, dated July 5, 1910, Serial No. 544,917. Application for reissue filed November 14, 1910, Serial No. 592,408. Divided and this application for reissue filed March 24, 1911. Serial No. 616,779.

DIVISION B.

*To all whom it may concern:*

Be it known that I, JOHN H. BURKHOLDER, a citizen of the United States, residing at Ashland, in the county of Ashland and State of Ohio, have invented certain new and useful Improvements in Ratchet Devices for Lifting-Jacks, of which the following is a specification.

My invention relates to ratchet mechanism for lifting jacks, and the invention consists in a mechanism having a gravity return as well as certain novel operating and controlling parts combined therewith, all substantially as shown and described in my application for reissue filed November 14, 1910, Ser. No. 592,408, and of which this application is a division.

Figure 1:
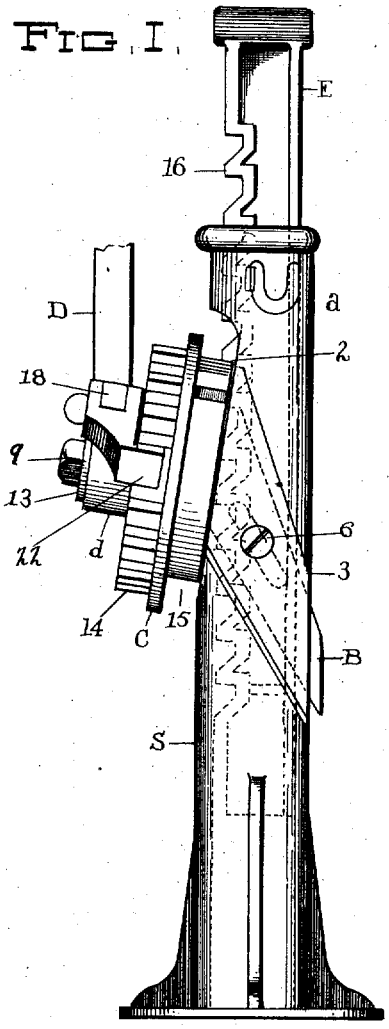
Figure 2:
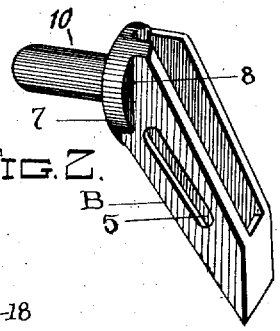
Figure 3:
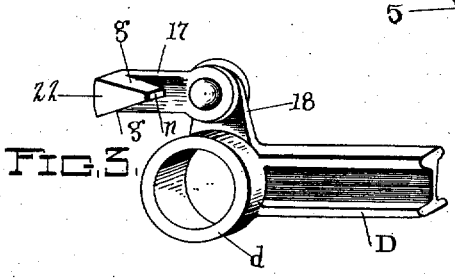
Figure 4:
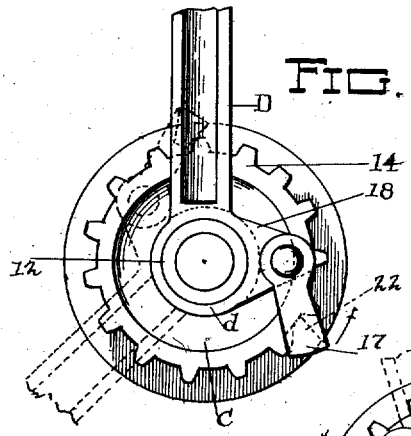
Figure 5:
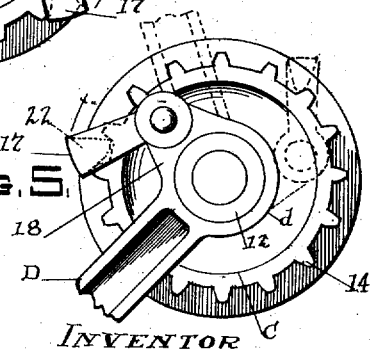

In the accompanying drawings, Figure 1 is a vertical sectional elevation of the complete device through the axis of the actuating mechanism. Fig. 2 is a perspective view of the yoke on which the actuating parts are mounted. Fig. 3 is a perspective detail of a portion of the lever and the pawl or dog thereon. Figs. 4 and 5 are side elevations of the actuating wheel and the lever and its dog therewith, the said dog or pawl being shown in different positions on the wheel as hereinafter fully described.

The construction thus shown comprises several separate and distinct elements operatively related and begins with the standard S as a support for all the others.

The yoke B has an open or skeleton body with parallel flat sides tapered slightly between its ends as to top and bottom to seat within standard S, all as fully set forth in the companion application above specified, and has a channel or groove 5 lengthwise in one side adapted to be engaged by a screw through the side of the standard and to retain the yoke in place. The said yoke also has a head 7 with shoulders 8 at its side adapted to rest against the edges 2 of the standard and a spindle 10 upon which the operating parts C and D are mounted. The said wheel has a tubular hub 12 at its outer side and is rotatably confined on said spindle by washer 13 and screw 19, and said lever or handle D has a hub *d* sleeved over the hub 12 of wheel C and is rotatably confined thereon by said washer.

The wheel C has teeth 14 about its outer side next to its central periphery or edge and a cam 15 on its inner side adapted to operatively engage teeth or projections 16 on the lift-bar or member E. A dog or pawl 17 is pivotally mounted on the extremity of a right angled projection or extension 18 at the base and edge of lever D opposite its pivot on hub 12 and is adapted to be reversed or thrown to either side into engagement with the teeth 14 to operate the wheel C by lifting or depressing the lever D as hereinafter more fully described.

As above indicated, the ratchet dog or pawl 17 is pivoted on the extremity of the projection or extension 18 on pivot hub *d* of lever D and said pawl has an inwardly projecting V shaped tooth 22 laterally at its end and side which has flat sides *g* and a central edge or bite *n* adapted to engage over or upon the teeth 14 of the wheel C and rotate said wheel in either direction according as said pawl is thrown to one side or the other of said projection and said lever is operated with a downward or an upward movement, Figs. 4 and 5.

Special importance attaches to this construction and arrangement of parts, first, because actuating mechanism is thus provided at the nearest practicable point to the pivot of the lever to get the maximum of lift with a given amount of expended strength, but for the more important reason that it provides reversal of operation by simply throwing the pawl across its pivot to either side. Obviously to do this the said pawl must have its pivot at or opposite the pivotal axis of the lever on a different radial line than said lever and preferably at right angles thereto so that said pawl will always be in such relation to the circle of teeth 14 that it can be turned in an arc about said axis an equal distance to either side and work in like manner in both positions. This also enables me to use what is essentially a gravity pawl or one which will ride or slide from tooth to tooth over the series of teeth 14 in its return and drop by its own weight or gravity into working engagement with the first advance tooth whichever way the lever is operated. The stroke of the lever is always between the same radial points on the same side of standard S in either operation, and this is a necessary requirement and advantage only to be gained in a gravity pawl by locating the pivot thereof on the handle substantially as shown and described.

In operation, if the parts be in the position full lines, Fig. 4, and lever D be depressed in the direction of the arrow or toward the dotted lines the wheel C will be engaged by the pawl and rotated a corresponding distance, and then as the said lever is raised again to full lines or in that direction the pawl will be carried with a sliding movement on one of its flat sides back over the teeth 14 and gravitate or drop into engaging position at the end of the stroke. A like result follows when the pawl is thrown to the opposite side of projection 18, as in Fig. 5, and lever D is raised to effect rotation of wheel C.

In all the operations of the jack the cam 15 on the back of wheel C holds the lift member where it has been moved and permits the lever and pawl to be freely operated and take a new hold. When the parts are as shown in Fig. 4 the lever is adapted to be depressed to lift the load, and when as shown in Fig. 5 the lever and pawl are in position to raise the lever and lower the load. In both cases the pawl is intended to hold a corresponding operating relation to the lever and projection 18 on opposite sides thereof and in either case until purposely changed and does not reverse by mere gravity. The dotted lines in Fig. 5 show the extreme limit to which the pawl can be carried without self reversal but ordinarily the operator would not deem it safe to carry it so far around. In this respect Fig. 4 shows a safer relation of the parts.

What I claim is:

1. In lifting jacks, a standard and a stationary stud on the side thereof, a wheel rotatably mounted on said stud and a lever pivotally mounted outside of said wheel and having a lateral projection opposite its axis, and a reversible pawl pivoted on the said projection having an inwardly extending tooth overhanging said wheel and adapted to drop by gravity into working engagement with said wheel and to slide over the teeth thereof on its return stroke.

2. In lifting jacks, a standard and a device to be actuated, a stud at the side of said standard and an actuating wheel mounted on said stud and adapted to be operatively engaged with said device, a lever pivotally mounted on the outside of said wheel on said stud and provided with a lateral projection opposite its axis of rotation, and a gravity pawl pivotally mounted on the said projection and adapted to rotate said wheel in either direction at will.

In testimony whereof I affix my signature in the presence of two witnesses.

JOHN H. BURKHOLDER.

Witnesses:
H. A. WYKINUTZ,
JACOB ROTH.

Copies of this patent may be obtained for five cents each, by addressing the "Commissioner of Patents, Washington, D. C."